Dec. 25, 1962 G. P. HUPPKE 3,070,460
COATED ALUMINUM COOKING FOIL AND METHOD OF MANUFACTURE
Filed Dec. 16, 1959 2 Sheets-Sheet 1

GLEN P. HUPPKE
INVENTOR

BY Theodore E. Simonton
ATTORNEY

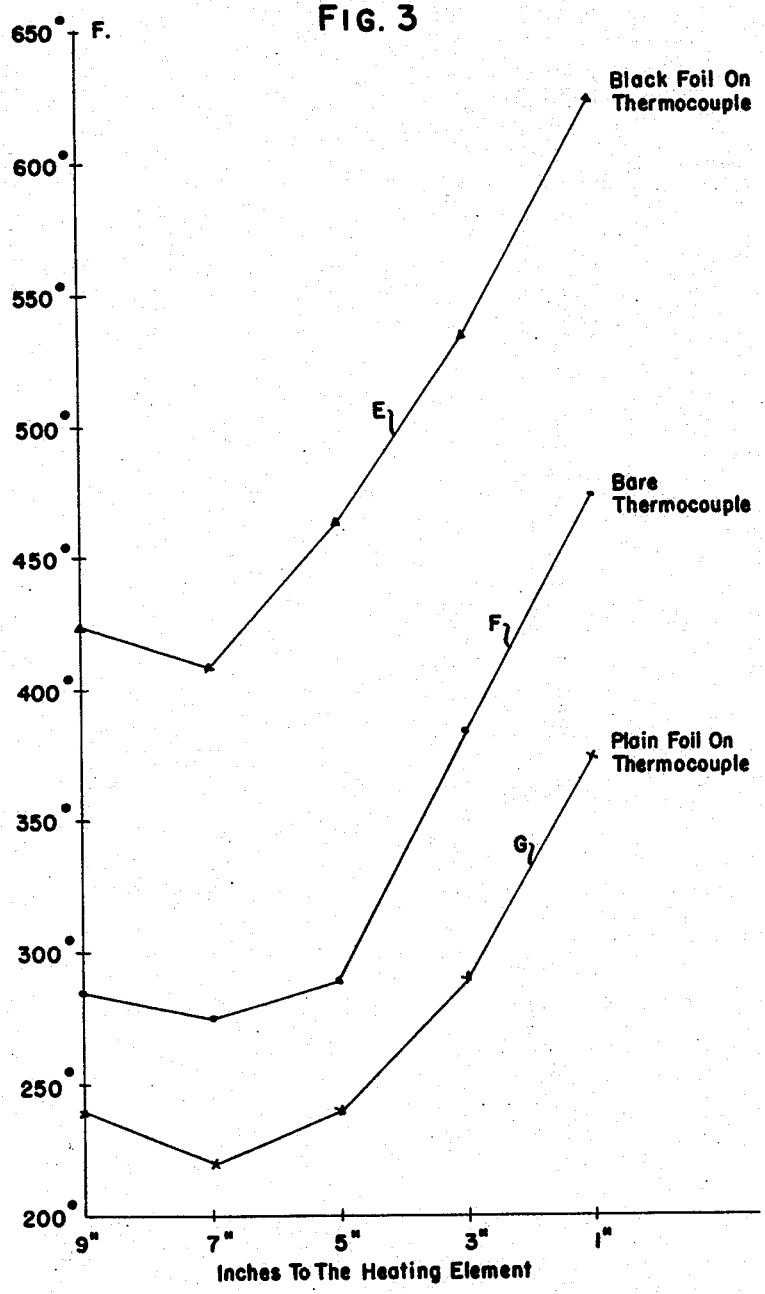

United States Patent Office 3,070,460
Patented Dec. 25, 1962

3,070,460
COATED ALUMINUM COOKING FOIL AND
METHOD OF MANUFACTURE
Glen P. Huppke, Beaver Falls, N.Y., assignor to Fiber Products Research Center, Inc., Beaver Falls, N.Y., a corporation of New York
Filed Dec. 16, 1959, Ser. No. 859,927
7 Claims. (Cl. 117—119.6)

This invention relates to an improved aluminum cooking foil for use in the baking and broiling of foods. It relates specifically to a coated aluminum cooking foil which affords more efficient use of available heat during the cooking operation and which has improved cooking characteristics.

A primary object of this invention is the provision of an aluminum foil having superior cooking qualities.

An object of this invention is the provision of an aluminum cooking foil for the baking or broiling of food stuffs to allow cooking at a faster rate than has heretofore been possible, while at the same time permitting a variation in the degree of cooking throughout a single piece of food, such as a roast, which is not obtainable using the ordinary aluminum cooking foils.

Another object of this invention is the provision of a cooking foil which will allow the browning of the outside of the food being cooked without the necessity for opening the foil to expose the food as a final step in the cooking process.

Another object of this invention is the provision of an aluminum cooking foil which will more effectively utilize the available cooking heat, thereby affording to the housewife a reduction in cooking costs.

A specific object of this invention is to provide a radiant heat absorbing coating on one side of alumium foil which will remain affixed to the foil and will not rub or chip off, and will not crack when the foil is folded or wrinkled during ordinary culinary use.

An object of this invention is to provide an inexpensive radiant heat absorbing coating which can be applied to an aluminum cooking foil in a simple manner without greatly increasing the cost to the housewife.

Another object of this invention is to provide a radiant heat absorbing coating for an aluminum cooking foil which is non-volatile, non-combustible, physically stable and will remain affixed to the foil in the presence of flame and extreme heat.

Another object of this invention is to provide a radiant heat absorbing coating for an aluminum cooking foil which is non-toxic and in no way affects the taste or appearance of the foods cooked in it.

A further object of this invention is to provide a radiant heat absorbing coating for an aluminum cooking foil which is chemically inert and will serve effectively in contact with water, steam, oil and the many condiments and dressings used by the housewife under ordinary cooking conditions.

Other objects and advantages will become apparent from the following description and the accompanying drawings, in which:

FIGURE 3 is a distance-temperature graph indicating the difference in temperature between thermocouples wrapped in ordinary aluminum cooking foil and wrapped in my improved aluminum cooking foil, taken at varying distances from a heat source.

Figures 1, 2:
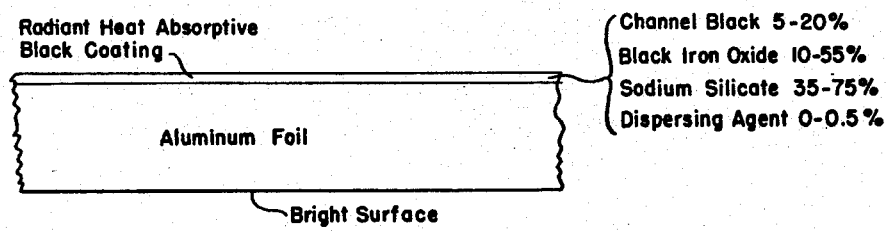
FIGURE 1 is a diagrammatic view of the coated aluminum foil of my invention together with a list of the preferred components with their range of composition in percentage by weight.
FIGURE 2 is a time-temperature graph indicating the internal meat temperature taken at the center of three-inch meat slabs during a cooking operation, wherein some of the slabs were wrapped in ordinary aluminum cooking foil and others in my improved aluminum cooking foil.

Aluminum foil has recently come into wide-spread use as an aid to the housewife in the baking and broiling of foods. The use of foil reduces splash, smoke and odor from the material being cooked. Enclosing the food stuff in foil results in a reduced cooking time and makes possible a considerable reduction in the loss of weight and flavor. Owing to its disposable nature, aluminum cooking foil has considerably lightened the burden of cleaning up following the preparation of a meal.

An outstanding property of aluminum is its high reflectivity for heat and radiant energy. The brilliant character of the surface of aluminum foil constitutes an ideal reflector, which means that ordinary aluminum foil cannot take full advantage of the available heat of an oven. Indeed, as shown hereinafter, it can adversely affect heat transfer during cooking, thereby increasing cooking costs.

The inefficiency of conventional aluminum foil was recognized by Touceda in United States Patent 2,759,830. It is a well-known phenomenon that a blackened surface will absorb infra-red rays or radiant heat energy far more readily than a surface of a lighter color. An aluminum foil colored black on it outer side permits utilization of the available radiant energy in addition to the convection heat transfer which occurs normally and still allows the desired enclosure of the food.

There are two basic methods of imparting color to a surface, either dyeing, or coating with a pigment. To adequately serve as a coloring agent for an aluminum cooking foil, the components of the agent must be non-toxic, physically stable and chemically inert. The agent should be black and must be firmly affixed to the foil and capable of withstanding mechanical abuse. These properties must not only exist at ordinary room temperatures, but must continue at extremely high temperatures and in contact with the oils, wines and dressings common in today's kitchens. The components of the coating must be inexpensive and capable of application to the aluminum foil in a fast and economical manner without the use of special equipment so that the improved product may be made available to the housewife without greatly increased cost.

Touceda proposed to take advantage of the black surface absorption phenomenon by coloring aluminum foil with organic dyes. To achieve this, the foil is first subjected to anodic oxidation, thereby creating a coating of aluminum oxide characterized by sub-microscopic porosity. The oxide coating is then treated with a black infra-red absorbent dye. However, the Touceda aluminum foil does not possess many of the properties required of a cooking foil. Many organic dyes are subject to temperature degradation or are soluble in water, steam or oil and might impair the quality of the food cooked in a foil colored by them. The initial expense of the organic dye is high and the application process involves special equipment and a plurality of steps, thereby increasing the cost of the final product to an uncompetitive level.

In my invention, a radiant heat absorbing coating is applied to one surface of ordinary aluminum foil. When wrapping food for cooking, the coated surface is placed on the outside and the remaining bright side is placed adjacent the food. In this manner, a heat trap is formed. On the outside, the radiant heat absorbing coating more efficiently utilizes the available radiant energy, while on the inside, the heat radiated by the cooking food is reflected back to the food by the bright interior surface of the foil enclosure.

The coating of my invention is composed of a black pigment, a bonding agent and a metallic oxide, the latter serving to stabilize the coating as will be hereinafter explained. A fourth component, a dispersing agent, is added in the preferred composition of my coating. The addition of such an agent in small amounts during the admixing of the components of the coating is desirable for reasons which will appear later. The dispersing agent breaks down during the final heat curing step of the process of application, as hereinafter explained, and is not present in the final coating except in minute quantities and in the form of its decomposition products.

There are numerous pigments having good temperature stability and a black or dark color. The least expensive of these is carbon black and the others are no more suitable for the purpose of my invention. The carbon black must be finely divided so as to obtain good coverage with a thin coating film. The selection of a specific type of carbon black greatly affects the amount of that material required in the coating, for the reason that the coarser blacks must be present in higher percentages to give the same coverage or blackening effect to the foil that can be obtained using a finer particle size black. It has been found preferable that the black used be the finest divided black available consistent with the desire for an economic product.

It is preferable that the carbon black used should be a channel black. If the black is not substantially free of volatile organic materials, the volatiles will be released during the curing step of the process of application, resulting in smoking, bubbling or flaking of the coating. This results in ruptures and irregularities in the film surface, making for an unsightly product having a reduced heat utilization efficiency. Volatiles that are not driven off during the curing step might be released while the foil is in use and result in the impairment of the quality of the food being cooked. For this reason, I do not use furnace blacks in the preferred formulation of my coating.

Water soluble silicates have found use in fire and corrosion-resistant paints and coatings because the silicate deposits on metal surfaces in a thin film. Soluble silicates have been used in coatings for metal parts of furnaces where the silicates not only provide the binding action to hold the filler materials to the metal but also form a coating to protect these materials from oxidation at high temperautres. In the coating of my invention, I have found that a sodium or a potassium silicate is most suitable but the cheapness of sodium silicate makes it the more economic material. A sodium silicate having a low silicate content does not have the necessary chemical stability but has a tendency to effloresce upon exposure to the atmosphere, thereby impairing the quality of the coating. Even after the coating is cured in the manner to be described later, I found that prolonged exposure to the atmosphere under conditions of high humidity resulted in efflorescence and the coating gradually turned white with the formation of sodium carbonate. Complete freedom from efflorescence can be obtained by using the more expensive potassium silicate but I found that sodium silicate films adhere better to the aluminum foil.

In order to obtain a coating which does effloresce employing soluble sodium silicate, I use a sodium silicate having a high silicate content together with a metallic oxide and in the final step of the application process, I subject the coating to a high-temperature curing step. The high silicate content materials have a reduced tendency to effloresce and the addition of a metallic oxide further reduces this susceptibility and aids in insolubilizing the silicate. The use of a metallic oxide in combination with a high silicate content sodium silicate gives a film which will not effloresce and has the best physical characteristics for the purposes of my invention.

There are many metallic oxides which would serve to decrease the solubility of a silicate. In particular, I have found that zinc oxide and black iron oxide serve well as a component of my coating. Zinc oxide is white, making it necessary to use an increased amount of carbon black to achieve a truly black coating. For this reason, $Fe_3O_4$, magnetic black iron oxide, is the preferred component. The iron oxide should have a particle size not greater than one micron to achieve the most desirable coating.

The addition of the iron oxide causes agglomeration of the carbon particles, making it difficult to obtain a thin coating which will cover the foil adequately. A satisfactory coating mixture is obtainable by using a ball mill or other high shear mixing device but this is awkward and expensive. For this reason, during the mixing of the coating, I prefer to add a small amount of a dispersing agent. Almost any of the commercial dispersing agents is satisfactory and in my prefered form, I use a dispersing agent known as Darvan No. 1, which is the polymerized sodium salts of alkylnaphthalene sulfonic acids. During the final curing step of the coating process, the Darvan decomposes, leaving inert decomposition products without impairing the chemical or physical properties of the coating.

Each of the preferred components is readily available in large quantities at a low price and, when applied in the proper manner to aluminum foil, they form a non-combustible and chemically inert black film, which is firmly affixed to the aluminum surface and is capable of withstanding mechanical abuse. The components are very simply mixed with water for the purposes of the application step, the water being removed from the coating in a final drying and curing operation. Since the coating mixture consists of four components, the preferred formulation of the coating on a weight percent dry solids basis is quite simple, the most suitable found to be as follows:

(1) 56.0 percent sodium silicate
(2) 8.7 percent channel black carbon
(3) 34.8 percent magnetic iron oxide
(4) 0.5 percent Darvan No. 1

In preparing the coating, the Darvan is first dissolved in distilled water. The carbon black and iron oxide are then dispersed into the solution using slight agitation. This mixture is then aded slowly to the sodium silicate solution. I prefer to use the sodium silicate solution at 40° Baumé, the commercial strength, without dilution.

This preferred composition possesses the desired atmospheric stability as a wet coating and is capable of being smoothly applied in a thin film to uniformly cover the surface of the aluminum foil. Such coating manufactured according to the process hereinafter described does not effloresce, adheres to the aluminum foil, and has the physical characteristics desired for an aluminum foil to be used in cooking. The coating has good film strength and is highly insoluble.

The composition of the coating may be varied considerably without deleterious effect upon the quality of the product. The effective range of iron oxide content is 10 to 55 percent, while the range of feasible silicate concentrations is between 35 to 75 percent. The channel black content may be varied from 5 to 20 percent, the optimum value being dependent upon particle size which affects the hiding or covering power of the black. The Darvan No. 1 is used in a maximum of 0.5 percent, and because it is merely a process aid and is not present in the final product, the minimum amount that can be used is zero.

The application of the coating to one side of the aluminum foil is a simple one-step process requiring no special equipment. Almost any of the known coating machines in commercial use today are suitable to accomplish this step.

The drying process is performed in two steps, the second of which is critical to the formation of a chemically stable coating. The first step, after the application of the wet film to the aluminum surface, is the evaporation of the free water of the film by mild heating. The drying of this apparent liquid moisture from the film should be accomplished slowly and at a temperature below the boiling point of water so as to avoid rupturing the coating before it becomes affixed to the aluminum. In doing this, I have found infra-red heat to be the most desirable energy source.

The second step, a high-temperature curing step, is necessary and of the highest importance in obtaining a stable coating. Silicates dehydrate stepwise and, if the dehydration is not carried far enough, it may be reversible. Improper curing makes for a final product which is not chemically stable nor can it withstand the mechanical abuse required in normal cooking usage. I have found that the curing step may best be accomplished by quickly flashing the foil to a temperature in the range of 400–500 degrees Fahrenheit.

Aluminum cooking foil manufactured by the above-described process will possess all of those properties enumerated as being required of a colored cooking foil for safe and economical use in cooking food. Furthermore, in kitchen tests conducted using my improved foil, it was found that it greatly increased the ability of the cook to achieve those qualities deemed most desirable in cooked foods. Specifically, meats cooked in the improved foil are browned on the outside during the cooking process. This is not normally true where ordinary cooking foils are used. There it is necessary to open the foil during the last minutes of the cooking operation to obtain browning, otherwise the meat will have a gray, steamed look which is undesirable.

It was also found that the improved cooking foil made possible a greater variation in the degree of cooking obtainable. Roasts cooked in the improved foil were well-done on the outside while being rare at the center. On the other hand, due to the inability of ordinary foils to utilize the total available heat, roasts cooked in them have to be cooked for a longer period of time which limits the possibility of obtaining a finished product with sufficient variation in the cooking to please both those who like their meat rare, and those who like it well-done.

FIGURE 1 is an edge view of a sheet of aluminum foil blackened on one side in the manner described. Referring more particularly to the drawing, a composite metallic sheet is shown as comprising a sheet of aluminum foil having affixed to its upper side a black coating capable of absorbing radiant heat. Shown at the right of the figure is a list of the components of the coating with the range of composition of each on a weight percent solids basis. The under side of the foil is untreated and is left bright for use adjacent the food to be cooked.

FIGURE 2 is a graphical record of the results of tests wherein three-inch meat slabs were cooked in ordinary foil and in my improved foil, two tests being run, each being at different distances from the heating element. This graph depicts the internal temperature, in degrees Fahrenheit, taken at the center of three-inch-thick pieces of meat, as a function of cooking time, shown in minutes. The results of the first test appear as the dotted lines A and B. In this test the meat was placed three inches from an infra-red heating element. The line A is a record of the internal temperature of the meat wrapped in my improved coated aluminum foil, while the line B is a record of the internal temperature of the meat cooked in ordinary foil. Likewise, the lines C and D constitute a record of the internal temperature of the meat cooked in my coated foil and ordinary foil, respectively, the upper surface of the meat being placed six inches from the heating element. As seen in FIGURE 1, in the test where the meat was farthest from the heater, line C shows that ninety minutes were required to obtain a 160° F. central temperature within the meat sample wrapped in the improved foil. At that time, the internal temperature of the sample wrapped in ordinary foil, as indicated by the line D, was about 100° F., and that meat was nearly raw. On the test where the meat was moved to within three inches of the heaters, the internal temperature of the black-foil-wrapped meat rose to 170° F. in sixty minutes, as indicated by line A. At that time, line B indicates the internal temperature of the bright-foil-wrapped meat was 90° F., and again the meat was completely raw. In both of these tests, the meat cooked in my improved foil was brown on the outside, the exterior meat being well-done while in the center the meat was cooked to a degree of red rareness of which any housewife would be proud. The meat cooked in ordinary foil, besides being raw, had a whitish, steamed appearance.

FIGURE 2 is a plot of temperature in degrees Fahrenheit measured at different distances, shown in inches, from an infra-red heating element. These temperatures were measured using three thermocouples, one bare, one covered with ordinary aluminum cooking foil, and one covered with my improved coated aluminum foil. The lines E, F and G are records of the temperature of the thermocouple wrapped in black foil, respectively, at different distances from the heating element. It is apparent from the graph that the temperature inside the black foil, as indicated by line E, was at all times higher than the temperature of the other two thermocouples. For example, at a three-inch distance from the heating element, line G shows the temperature inside the ordinary aluminum foil to be 290° F., the temperature inside the black-coated foil, as shown by line E, is over 510° F., while the temperature of the bare thermocouple, indicated by line F, is 385° F. This graph clearly indicates the disadvantage of wrapping foods in ordinary foil and the advantage of wrapping foods in my improved foil, over cooking without using any foil whatsoever, from the standpoint of utilization of available radiant heat.

I claim:

1. A coated sheet material designed to be used for wrapping food products to be cooked under conditions of radiant heat, comprising a sheet of relatively thin aluminum, one surface of which is provided with an infra-red absorbent coating containing from about 5 percent to about 20 percent carbon black, from about 35 percent to about 75 percent soluble silicate, the remainder of said coating consisting principally of a metallic oxide capable of decreasing the solubility of the silicate upon dehydration thereof, and said silicate being irreversibly dehydrated.

2. A coated sheet material as defined in claim 1, wherein the metallic oxide is magnetic iron oxide.

3. A coated sheet material designed to be used for wrapping food products to be cooked under conditions of radiant heat, comprising a sheet of relatively thin aluminum, one surface of which is provided with an infra-red absorbent coating containing from about 5 percent to about 20 percent carbon black, from about 35 percent to about 75 percent sodium silicate, and magnetic iron oxide from about 10 percent to about 55 percent, the sodium silicate being irreversibly dehydrated.

4. A method of manufacture of a composite sheet material comprising aluminum foil, one side of which is coated with a film containing carbon black, a soluble silicate binder, and a metallic oxide capable of decreasing the solubility of the silicate upon dehydration thereof, wherein the components of the coating are first dispersed in water, then applied to one side of the metal foil in a thin film, and then dried and subjected to heat treatment sufficient to irreversibly dehydrate the silicate.

5. A method of manufacture according to claim 4, wherein the drying and heat treatment comprises a first step wherein the free water of the film is evaporated at a low temperature, and a second step wherein the product is subjected to a high temperature sufficient to irreversibly dehydrate the silicate.

6. A method of manufacture according to claim 5, wherein the first step is accomplished at a temperature below the boiling point of water.

7. A method of manufacture according to claim 5, wherein the second step is accomplished at a temperature between 400° and 500° Fahrenheit.

References Cited in the file of this patent

UNITED STATES PATENTS

| | | |
|---|---|---|
| 2,157,155 | Work et al. | May 9, 1939 |
| 2,440,969 | Nightingall | May 24, 1948 |
| 2,628,175 | Henderson | Feb. 10, 1953 |
| 2,711,974 | Happe | June 28, 1955 |
| 2,759,830 | Touceda | Aug. 21, 1956 |
| 2,916,395 | Owen | Dec. 8, 1959 |